Feb. 28, 1961 F. KOURY 2,973,436

LIGHT AMPLIFIER AND STORAGE DEVICE

Filed April 9, 1957

INVENTOR.
FREDERIC KOURY

BY

Kenway, Jenney, Witter & Hildreth

ATTORNEYS

United States Patent Office 2,973,436
Patented Feb. 28, 1961

2,973,436

LIGHT AMPLIFIER AND STORAGE DEVICE

Frederic Koury, Lexington, Mass., assignor, by mesne assignments, to Sylvania Electric Products Inc., Wilmington, Del., a corporation of Delaware Filed Apr. 9, 1957, Ser. No. 651,791

11 Claims. (Cl. 250—213)

This invention relates in general to methods and devices for the amplification and storage of light or of other radiant energy. Specifically, the invention relates to a device for amplifying the brightness of an optical image or for storing energy in the form of light for any one of numerous applications, such as the memory unit of a computer, television in black and white or color, or for any system where the storage or amplification of light is useful.

The amplification of light by combining a layer of photoconductive material with an electro-luminescent layer is now a well-known technique. In fact, in my prior pending application, Ser. No. 631,131, filed December 28, 1956, I have disclosed an improvement on such known light amplifiers. The improvement which I disclosed in that application relates to the structure of the photoconductive layer of the device. Prior to my invention, the photoconductive layer in the light amplifier was relatively inefficient in that the incident light did not penetrate the entire layer. Thus, the change in resistance due to the photoconductive effect was limited, the photoconductivity being a surface effect. In my previous invention I provided a number of apertures in the photoconductive layer. In the preferred embodiment of that invention, the holes extend entirely through the layer from one side to the other. An electrical connection is provided on each side of the layer and a continuous surface path between each of the electrical connections along the inside surface of the holes is established. In this way, the entire path from one side of the layer to the other is directly affected by incident light rather than just the outer layer surface of the prior art devices.

Although the improvement in efficiency derived from the use of my invention was considerable, further efforts have been made to improve the device. One of the techniques developed has shown some promise. This technique involved the etching of a glass plate to remove areas of the glass and leave a number of glass columns. The columns are then treated to form the photoconductive layer. Unfortunately however, it has proven at least at the present time, impossible to achieve the degree of accuracy and reproducibility necessary for the finished device to be a highly successful commercial product.

Therefore, it is an object of my present invention to provide a technique and product which are feasible for use in large scale production of light amplifiers and storage devices.

Another object of my invention is to provide accurate and consistent light amplifiers and storage devices.

Still another object of my invention is to reduce the cost of light amplifiers and storage devices.

A further object of my invention is to reduce the waste usually associated with the fabrication of light amplifiers and storage devices.

A still further object is to provide a light amplifier and storage device, the geometry of which is the principal determining factor of the operating characteristics of the device.

In general, the present invention consists in an accurately dimensioned and easily reproducible matrix for a photoconductive layer combined with an electroluminescent layer in a light amplifier or storage device. The matrix is formed from a piece of glass plate of dimensions which are relatively uncritical. The glass is cemented to a steel plate and run through a milling machine on the arbor of which are mounted ganged saws. Two passes of the plate are made under the saw, one pass at right angles to the other. A series of square pedestals are thus formed on one side of the glass. The glass is then turned over and the process is repeated on the other side. In one of the sides or the other it is desirable that the depth of cut be set carefully in order that a predetermined thickness of glass exist between the bottoms of the opposing slots. After cutting, the plate is heated to a high temperature and a conductive film is sprayed on both sides of the plate.

Independently of the foregoing operations, an electroluminescent member is prepared to receive the slotted glass plate. The materials used and the method of preparation of the electroluminescent member may advantageously be as described in my previously cited pending application Serial No. 631,131, filed December 28, 1956. Briefly, however, such a member includes a glass base plate coated with a transparent conductive film and having an electroluminescent layer disposed upon the conductive film. Glass frit is sprayed on top of the electroluminescent member and the previously prepared slotted glass blank is then placed on the frit. The assembly is then fired, causing the frit to glaze and to bond the electroluminescent member to the slotted glass blank.

Now, I once again pass the assembly through the milling machine and cut through the slots previously formed. The cuts which I make at this time are approximately half the width of the original slots, and are centered therein.

At this point, I provide an opaque webbing for purposes which will be explained in greater detail hereinafter between the glass pedestals. This is accomplished by flowing an opaque substance such as a black frit in a liquid vehicle or black enamel through the slots adjacent the electroluminescent layer.

I then spray the assembly with a photoconductive material such as cadmium sulfide in an organic vehicle such as ethyl cellulose acetate lacquer. The spraying operation covers the glass pedestals and partially fills the area between pedestals with photoconductive material. After the spraying operation, I fire the assembly to sinter the photoconductive material to the glass.

Finally, I grind the tops of the glass pillars with metallurgical polishing paper to expose the conductive film caps on the pedestals. To energize the device I apply suitable potentials between the conductive coating of the electroluminescent member and a top electrode which may be an electro-formed metal screen bonded by silver or by fusible alloys to the conductive film caps. In some instances it has proven desirable to coat the conductive film with a silicone or melamine alkyd binder and utilize capacitive input coupling. These and other objects, features, and advantages will become apparent from a reading of the following detailed description of a preferred embodiment of the invention selected for purposes of illustration and shown in the accompanying drawings in which:

Figure 1:
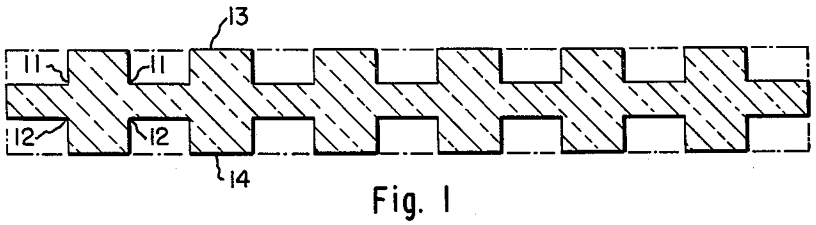
Fig. 1 is a schematic view of the glass blank from which the matrix is to be formed.

The glass blank illustrated in Fig. 1 may be made of commercial glass which commonly varies in thickness between .060" and .085". The dotted lines in the figure indicate the depth and location of slots. Similar slots, of course, run in the direction of the plane of the paper. I have found that the electrical properties of the ultimate device require that the thickness of the glass between opposing slots be held to close tolerances. A typical section wherein the dimension must be held to close tolerances is that between the bottoms of the slots denoted by numerals 11 and 12. It is possible to make the slots on the side 13 without great concern for the depth of cut. However, when the slots are made in side 14, the depth of cut must be held critically to preserve the desired glass thickness between the bottoms of slots.

In the actual cutting of the slots, I back my glass blank by a steel plate which is not shown. The glass blank may be cemented to the steel plate in any one of several ways, but I have found the most satisfactory method has been to use double-back pressure-sensitive tape. The use of such tape simplifies the attachment of the glass blank to the steel plate and at the same time, gives a highly satisfactory temporary bond.

The steel plate with the glass blank attached is placed on the sliding table of a standard milling machine. A number of similar, equally spaced saws is mounted on the arbor of the milling machine. A pass is made in one direction perpendicular to an edge of the glass blank to cut slots running in a first direction through the surface of side 13 of the glass blank. For reasons which will become apparent later, I have found it convenient to utilize a saw blade of thickness equal to about one-half the desired width of the slot. After the first pass, I index the table in a direction perpendicular to that of the slots through a distance about equal to the thickness of the saw blade. I then make a second pass in the same direction as the first and achieve a slot width of about double the thickness of the saw blade.

The plate is then turned through 90° and mounted on the milling machine table again. A third pass is then made in a direction perpendicular to the first pass. In the same manner as that used in cutting the slots in the first direction, I index the table and make a fourth pass to obtain slots corresponding in width to those made in the first direction.

The blank is then detached from the steel plate, turned over, and sealed in place again. The entire process of slotting executed on side 13 is repeated on side 14 in such fashion that the slots on the one side are aligned with those on the other. In slotting side 14, by way of example, if the distance from the bottom of the slot at point 11 to the surface of side 14 were .040", I would make the slots in side 14 .015" in depth. This would then leave the thickness of glass between points 11 and 12 at about .025". Although the width of the slots is not extremely critical, I have found that .035" is a suitable dimension and can be achieved by two passes of a standard saw which runs about .018" width.

Figure 2:
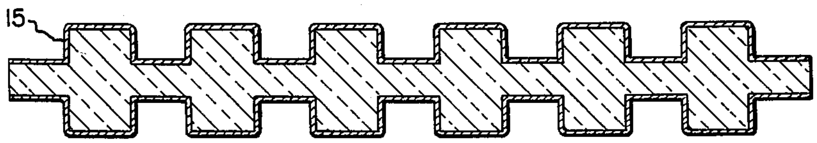
Fig. 2 is a sectional view of the glass blank after slotting and application of the conductive film.

Once the slotting operation is completed, I place the blank on a Vycor plate which is optically flat. This aids in maintaining the blank in a substantially flat condition during the firing operation which follows immediately. In the firing operation, I heat the blank to about 600° C. The plate is then removed from the furnace and sparyed on both sides with a transparent conductive film 15 as shown in Fig. 2. Numerous such films are known and the one of these which I prefer is a tin chloride. The spraying of the conductive film must be done while the plate is still hot from the firing operation. This is necessary in order that the tin compounds become sufficiently decomposed.

Figure 3:
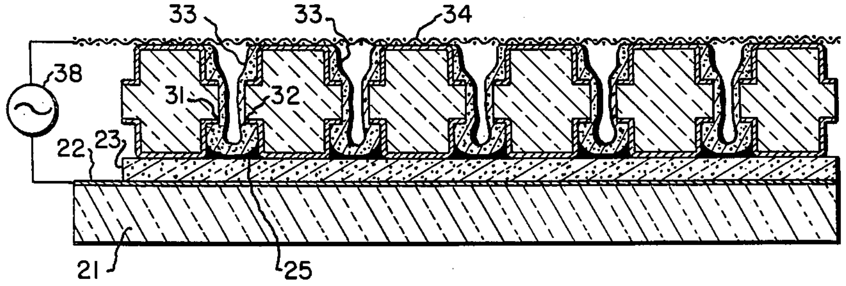
Fig. 3 is a sectional view of the matrix with the photoconductive material embedded therein combined with the electroluminescent layer to form the completed light amplifier or storage device.

The electroluminescent member with which I combine my processed glass blank is prepared independently. Such a member is illustrated in Fig. 3 and it includes a glass base plate 21 on which there is provided a surface layer of transparent conductive coating 22. This coating 22 is entirely similar to the coating 15 on the glass blank previously described and it is applied in the same manner as that coating. Over the coating 22, I place an electroluminescent layer 23 which may advantageously be applied in the manner taught in the pending application of Rulon, Ser. No. 365,617, filed July 2, 1953, and assigned to the same assignee as the present application and now abandoned. The electroluminescent layer 23 consists of phosphor embedded in a solid dielectric material. The phosphor may be of a type well-known in the art, for example, copper and lead activated zinc sulfide as shown in U.S. Pat. No. 2,728,730 issued to Butler and Homer, December 27, 1955, and assigned to the same assignee as my present application. Also, the dielectric layer in which the phosphor is embedded can be, for example, of the ceramic or glass type shown in the above-cited application, Ser. No. 365,617.

Over the electroluminescent layer 23 I spray a solder glass or frit and lay the processed glass blank against the solder glass. It is then necessary to fire the assembly to bond the two members together. Because the electroluminescent material has a tendency to deteriorate in heat, I prefer to conduct this firing operation as quickly as possible without jeopardizing a good bond between the two members. I have found that a cycle of three minutes at 525° C. and second cycle for 45 seconds at 650° C. serves to achieve the desired purpose and does not deleteriously affect the electroluminescent material.

After the elements are bonded together, I flow an opaque material carefully through the slots adjacent the electroluminescent layer 23. A slim pipette or eyedropper may be used for this purpose and any one of several materials is suitable. An opaque black frit in a vehicle such as Xylol has proven to be quite satisfactory to form the thin opaque webbing 25. Alternatively, the solder glass frit used as a bonding substance between the blank and the electroluminescent layer may be of a lead base. By treating that portion of the frit between the glass pedestals with sodium sulphide, I can obtain a lead sulphide sufficiently opaque for my purposes.

In the flowing operation I find it unnecessary to depend upon gravity to carry the opaque fluid or the sodium sulphide solution through the slots. With the assembly quite flat, capillary action is sufficient to draw the fluid through the slots and thus form the opaque webbing 25.

After the firing operation which bonds the two elements together and the provision of the opaque webbing, I again place the asembly on the steel plate using the double-back pressure-sensitive tape previously mentioned or other suitable cement. Using the same ganged saws I originally used to provide the slots in the blank, I make one pass in the first direction with the saw blades centered in the slots. In the case of the .035" slots and the .018" saw blade, I obtain a configuration such as shown in Fig. 1. Each saw cuts a slot of about .018" in width, such as may be seen between the points 31 and 32, through the bridging glass. The cuts are made in both the first and in the second directions with the result that a series of independent glass pillars of rectangular or square cross-section are provided. The portions of the glass bridging members which are not cut away appear as centrally located enlarged projecting sections on the pillars. I have adopted this technique to avoid any possibility of disruption of the conductive coating. As is obvious from the drawing, the saw blade clears the conductive coating by at least .008" on either side.

After the cuts through the glass bridging members are complete, I apply to the matrix a photoconductive material such as cadmium sulphide, which is properly activated, as for example, by copper and halogens as is well-known in the art. The photoconductive material is preferably dispersed in a vehicle such as ethyl cellulose acetate lacquer and the application is made by spraying. A suitable technique and proper materials are disclosed in my previously cited pending application Serial No. 631,131. The areas between the glass pedestals are partially filled with the photoconductive material as seen at 33.

After the photoconductive material has been sprayed upon the matrix, I fire the assembly once more to sinter the photoconductive material to the matrix. Once again, Vycor plates which are optically flat, are used to preserve the flatness of the device.

The firing of the glass frit for sealing the glass piece of Fig. 2 to the electroluminescent layer 23, has considerable effect on the electroluminescent brightness of the latter, and the subsequent firing of the photoconductive layer 33 affects both the electroluminescence of layer 23 and the electrical characteristic of the photoconductive layer 33 itself. By way of example, for both of these firings, I have utilized a furnace operated between 500 and 550° C. in which the devices are placed for periods ranging from 10 minutes to one-half an hour.

Following the firing operation, I grind the tops of the glass columns with metallurgical polishing paper to expose the conductive film caps. In other words, only the photoconductive material is ground from the tops of the glass pillars.

To energize the device there are two feasible methods. One method is by direct contact, and the other by capacitive coupling. In the case of direct contact, one of the preferred structures is a screen 34 which may be applied to the top of the asembly. I have found that a screen of 400 mesh electro-formed nickel or other suitable metal bonded by an air drying type of silver paint or by fusible indium alloys to the conductive film caps provides an adequate contact. The return lead is, of course, attached to the conductive film 22 of the electroluminescent member. In those situations where capacitive coupling is desired, I coat the transparent conductive film on the glass tops with an organic binder such as silicone varnish or melamine alkyd resin. A flat electrode such as the screen mentioned above is placed on the insulating layer thus formed over the transparent conductive film to provide capacitive coupling to the film.

Although in the typical example described I have spoken of .035″ slots in the matrix, it is possible to greatly reduce the slot width and the dimensions of the glass pillars. In fact, it is possible to obtain resolution in the light amplifier which is higher than that in current television receivers. Regarding the utilization of my invention in conjunction with computers or other devices where storage or memory is required, I have found it possible to obtain an extinction time for the light from the phosphors which is measured in days. Conversely, I have obtained extinction times for the output light which are measured in microseconds. Thus, an image can be stored for practically any length of time desired.

In operating the device, a voltage is applied between the electrodes 22 and 34 which may for convenience be extended from the device as shown. This voltage is preferably an alternating voltage supplied, for example by a generator 38. The voltage supplied may be adjusted to avoid luminescence when the photoconductive layer is at any given ambient background level of illumination. In effect, adjustment can be made such that luminescence occurs only when light of a predetermined intensity falls upon the photoconductive layer.

If for example, the device were being used as a light amplifier for a television image, the image would be focused upon the top of the device, as shown in Fig. 3, and would appear with its light intensity amplified on the electroluminescent layer which would be viewed through the bottom of the glass base 21.

The theory of operation of the device may best be understood by considering the series nature of the connection between the elements of the device. Voltage is applied between the conductive caps which are all in parallel, since they are all connected to the top electrode 34 and the conductive film 22 beneath the electroluminescent layer. A conductive path is established through the conductive film 15 along the sides of the glass pedestals above and below the central projections. The surface areas of the photoconductive material adjacent the pedestals as well as those on the top of the device are exposed to incident light because of the transparency of the conductive film and of the glass pedestals.

The path of current flow is through conventional conducting members from the generator except in that area of the photoconductive material adjacent the central projections of the glass pedestals. As has been pointed out above, the dimensions of these projections are closely held by the sawing process. Accordingly, the length of surface of photoconductive material adjacent the projections is similarly closely determined and this I consider to be of importance in the practice of my invention by reason of the control of operating characteristics and the reproducibility of uniform and consistent devices which I achieve.

In the areas adjacent the projections, the resistance to the flow of current varies as a function of light incident upon the photoconductive material. With this variation of resistance, the potential applied across the electroluminescent layer also varies. Consequently, the light output of the electroluminescent material which is a function of the applied voltage, varies. This variation is necessarily in accordance with the variation of incident light as well as the variation of applied voltage.

A further variation in light output and, in fact, in color of the light output of the electroluminescent layer can be achieved by varying the frequency of the voltage applied.

The opaque webbing 25 serves several purposes. In the same fashion as was explained in my previously cited pending application, Serial No. 631,131, light from the electroluminescent layer itself may feed back onto the photoconductive layer and alter its operation. The opaque webbing prevents such light from reaching the photoconductive layer to vary its conductivity. Hence, the electroluminescence obtained results only from the light incident upon the photoconductive surface rather than from that generated within the electroluminescent layer.

Again referring to the webbing 25, it is clear that the photoconductive material disposed between adjacent pedestals may cause a short circuit between the conductive film on those pedestals, or at least a variation of resistance between those pedestals, if light from the electroluminescent layer falls upon that area. The opaque webbing serves to prevent this variation in resistance. Furthermore, the opaque webbing prevents halation due to internal reflections in the electroluminescent layer which might cause light from any given area to be reflected over to another area. Specifically, light passing through a given pedestal might be reflected from the lower surface of the electroluminescent layer or from other interfaces into a space between pedestals which is occupied by photoconductive material. This photoconductive material would then change its resistance, giving rise to the halation mention. The opaque webbing serves to prevent this form occurring.

Finally, and of importance in numerous applications, I have found that the energy incident upon the photoconductive layer need not be light to trigger the device. An electron beam, electromagnetic radiation and other forms of incident energy work equally well. Parameters equivalent to intensity in incident light provide a measure of control and the further controls of magnitude and frequency of applied voltage are also retained.

The invention should not be limited to the details of the specific embodiments disclosed, inasmuch as various modifications within the purview of the invention will suggest themselves to those skilled in the art. The invention should be limited only by the spirit and scope of the appended claims.

I claim:

1. A light amplifier and storage device comprising an electroluminescent layer, a photoconductive layer in series with said electroluminescent layer, a plurality of transparent members symmetrically disposed in said photoconductive layer, means for applying a voltage to said series layers, and means on said transparent members for limiting current flow through said photoconductive layer to predetermined portions thereof.

2. A light amplifier and storage device comprising, an electroluminescent layer, a matrix including a plurality of transparent pedestals, a layer of photoconductive material disposed upon said matrix, means for passing current through said photoconductive layer and said electroluminescent layer in series, and means on said matrix for limiting the flow of said current through said photoconductive layer to predetermined portions thereof.

3. A light amplifier and storage device comprising an electroluminescent layer, a matrix having top, center, and bottom portions, a conductive film on said top and bottom portions, said bottom portion being in contact with said electroluminescent layer, a photoconductive material disposed upon said matrix, means for applying a voltage between the conductive film on said top portion of said matrix and said electroluminescent layer to cause the flow of current through said conductive film on said top portion, through said photoconductive material adjacent said center portion, through said conductive film on said bottom portion and through said electroluminescent layer.

4. A light amplifier and storage device comprising an electroluminescent layer, a first transparent conductive layer in contact with one side of said electroluminescent layer, a photoconductive layer, a plurality of transparent members symmetrically disposed in and passing through said photoconductive layer, said members having top, center, and bottom portions, a second transparent conductive layer coated over said top and bottom portions, said coated bottom portions being in contact with the other side of said electroluminescent layer, an opaque webbing also disposed upon said other side of said electroluminescent layer and disposed between said transparent members, and means for applying a voltage between said first and said second transparent conductive layers to cause current to flow through said photoconductive material adjacent said center portions, the light output of said electroluminescent layer being a function of the resistance of said photoconductive material adjacent said center portions.

5. In a light amplifier and storage device having a photoconductive layer and an electroluminescent layer in series, the method of controlling the amount of photoconductive material through which current flows which comprises cutting at least a first slot of a given width in one surface of a glass blank, cutting at least a second slot of said given width in the opposite surface of said blank, said slots being aligned with one another and separated by a bridge of glass, applying a conductive film to both sides of said blank, cutting a slot narrower than said given width through said bridge of glass, and applying said photoconductive material to said blank, said material being in direct contact with said glass only on the opposed faces of said cut bridge of glass.

6. In a light amplifier and storage device having a photoconductive layer and an electroluminescent layer in series, the method of controlling the amount of photoconductive material through which current flows which comprises cutting at least a first slot of a given width in one surface of a glass blank, cutting at least a second slot of a given width in the opposite surface of said blank, said second slot being aligned with said first slot and being of a predetermined depth to leave a bridge of glass between the bottom surfaces of said slots of predetermined thickness, applying a conductive film to both sides of said blank, cutting a slot narrower than said given width centrally through said bridge of glass to leave projections having opposed faces and applying photoconductive material to said blank, said material being in direct contact with the glass of said blank only on said opposed faces of said projections.

7. The method defined in claim 6 including the further step of grinding the photoconductive material from said one surface of said blank to expose said conductive film thereon.

8. In a light amplifier and storage device having a photoconductive layer and an electroluminescent layer in series the method of controlling the amount of photoconductive material through which current flows which comprises cutting a first plurality of parallel slots of a given width in one surface of a glass blank, cutting a similar plurality of parallel slots of a given width in the opposite surface of said blank, said slots on said one surface being aligned with said slots on said opposite surface to leave bridges of glass between the bottom surfaces of said slots on said one surface and said slots on said other surface, applying a conductive film to both surfaces of said blank, cutting a plurality of slots narrower than said given width centrally through said bridges of glass to leave projections having opposed faces in said slots and applying photoconductive material to said blank, said material being in direct contact with the glass of said blank only on said opposed faces of said projections.

9. A light amplifier and storage device comprising an electroluminescent layer, a photoconductive layer in series with said electroluminescent layer, means for applying a voltage to said series layers, a plurality of transparent members disposed in said conductive layer, and means integral with said transparent members for limiting current flow through said photoconductive layer to predetermined portions thereof.

10. A light amplifier and storage device comprising an electroluminescent layer, a photoconductive layer in series with said electroluminescent layer, means for applying a voltage to said series layers, a plurality of transparent members disposed in said conductive layer, and means interposed between said photoconductive layer and said transparent members for limiting and determining the path of current flowing through said photoconductive layer.

11. In a light amplifier and storage device, in combination, a transparent base, a transparent conductive film on said base, an electroluminescent layer on said base, a plurality of transparent members of cruciform shape disposed upon said electroluminescent layer, a transparent conductive film surrounding and covering all portions of said transparent members except the ends of the arms thereof, said ends being at right angles to said electroluminescent layer and not in contact therewith, and photoconductive material disposed between said transparent members and in direct contact with said ends.

References Cited in the file of this patent

UNITED STATES PATENTS 2,773,992 Ullery -------------- Dec. 11, 1956